United States Patent
Zhao et al.

(10) Patent No.: US 7,901,491 B2
(45) Date of Patent: Mar. 8, 2011

(54) HYDROGEN STORAGE MATERIAL AND RELATED SYSTEM

(75) Inventors: Ji-Cheng Zhao, Latham, NY (US); Grigorii Lev Soloveichik, Latham, NY (US)

(73) Assignee: General Electric Company, Niskayuna, NY (US)

( * ) Notice: Subject to any disclaimer, the term of this patent is extended or adjusted under 35 U.S.C. 154(b) by 275 days.

(21) Appl. No.: 12/059,479

(22) Filed: Mar. 31, 2008

(65) Prior Publication Data

US 2009/0246575 A1 Oct. 1, 2009

(51) Int. Cl.
*H01M 8/06* (2006.01)
*B01J 31/02* (2006.01)

(52) U.S. Cl. ... 96/108; 502/526; 423/658.2; 252/182.12; 429/408

(58) Field of Classification Search .............. 96/108; 206/0.7; 420/900; 502/526, 150, 400; 423/248, 423/648.1, 658.2; 252/182.12; 429/19
See application file for complete search history.

(56) References Cited

U.S. PATENT DOCUMENTS

| | | | |
|---|---|---|---|
| 4,178,987 A * | 12/1979 | Bowman et al. | 165/104.12 |
| 6,596,055 B2 * | 7/2003 | Cooper et al. | 95/116 |
| 7,052,671 B2 * | 5/2006 | McClaine et al. | 423/658.2 |
| 7,501,008 B2 * | 3/2009 | Eshraghi et al. | 95/55 |
| 2005/0106097 A1 * | 5/2005 | Graham et al. | 423/648.1 |
| 2007/0026272 A1 | 2/2007 | Liu et al. | |
| 2007/0034532 A1 * | 2/2007 | Gershtein et al. | 206/0.6 |
| 2007/0128485 A1 | 6/2007 | Zhao et al. | |
| 2007/0227899 A1 * | 10/2007 | McClaine et al. | 205/637 |

* cited by examiner

*Primary Examiner* — Frank M Lawrence
(74) *Attorney, Agent, or Firm* — Francis T. Coppa

(57) ABSTRACT

Disclosed herein is a hydrogen storage material comprising a metal hydride and an organic hydrogen carrier. Also disclosed herein is a hydrogen storage/fuel cell system which employs the hydrogen storage material.

30 Claims, 1 Drawing Sheet

HYDROGEN STORAGE MATERIAL AND RELATED SYSTEM

BACKGROUND

While hydrogen has wide potential as a fuel, a major drawback in its utilization, especially in mobile uses such as the powering of vehicles, has been the lack of an acceptable lightweight hydrogen storage medium. Certain materials and alloys in solid state have the ability to absorb and desorb hydrogen. These materials have been considered as a possible form of hydrogen storage, due to their large hydrogen storage capacity. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a pressurized gas or a cryogenic liquid. Solid-phase storage of hydrogen in a metal or alloy system works by absorbing hydrogen through the formation of a metal hydride under specific temperature/pressure or electrochemical conditions, and releasing hydrogen by changing these conditions (usually under heating). Metal hydride systems have the advantage of high-density hydrogen storage for long periods of time.

Metal hydrides suffer some drawbacks though. The majority of metal hydrides are sensitive to oxygen and moisture. Exposure to air or moisture will result in an exothermic chemical reaction, causing the material to lose its hydrogen storage capacity and potentially creating a fire hazard. Additionally, adsorption and desorption of hydrogen occurs at elevated temperatures, requiring that the metal hydrides be surrounded by a heat transfer medium. Metal hydride is usually stored in a storage vessel thermally integrated with a heat exchanger, preferably an internal heat exchanger, to provide the most efficient heat transfer. The heat transfer mediums currently in use are metal fins or aluminum foam. To release hydrogen, it is necessary to heat the whole storage vessel thus increasing heat losses. Because on-board charging is not considered viable due to the high hydrogen pressure required and fast heat release, this hydrogen storage system requires that the storage vessel containing metal hydride and the heat exchanger be exchanged when the metal hydride is exhausted or contaminated and can no longer be effectively recharged with hydrogen. Container exchange is a labor intensive process that demands the redesign of cars and refueling infrastructure, and will hinder public acceptance of the technology in vehicles. Additionally, the container exchange would likely require container standardization across a wide assortment of vehicles—a daunting prospect. Consequently there is a need for a rapid method of refueling for hydrogen based energy systems and delivery of hydrogen to the fuel cell on demand, without heating of the whole storage tank. In fact, this need has been recognized by the U.S. Department of Energy in that they have set an ambitious goal of a three minute refueling time. It has been proposed to use a liquid organic hydrogen carrier that is capable of releasing hydrogen at heating, and transforming to a dehydrogenated liquid form. However, these organic carriers have low hydrogen content. Accordingly, there exists a need for high capacity hydrogen storage materials that facilitate refueling.

BRIEF DESCRIPTION

The aforementioned need is addressed, at least in part, by a hydrogen storage material comprising a metal hydride and an organic hydrogen carrier. The organic hydrogen carrier can be in liquid form or gel form.

Also disclosed herein is a hydrogen storage/fuel cell system comprising: a fuel cell in fluid communication with a dehydrogenation reactor; and a hydrogen storage material tank in fluid communication with the dehydrogenation reactor; wherein the hydrogen storage material tank contains a hydrogen storage material and the hydrogen storage material comprises a metal hydride and an organic hydrogen carrier.

DETAILED DESCRIPTION

Figure 1:
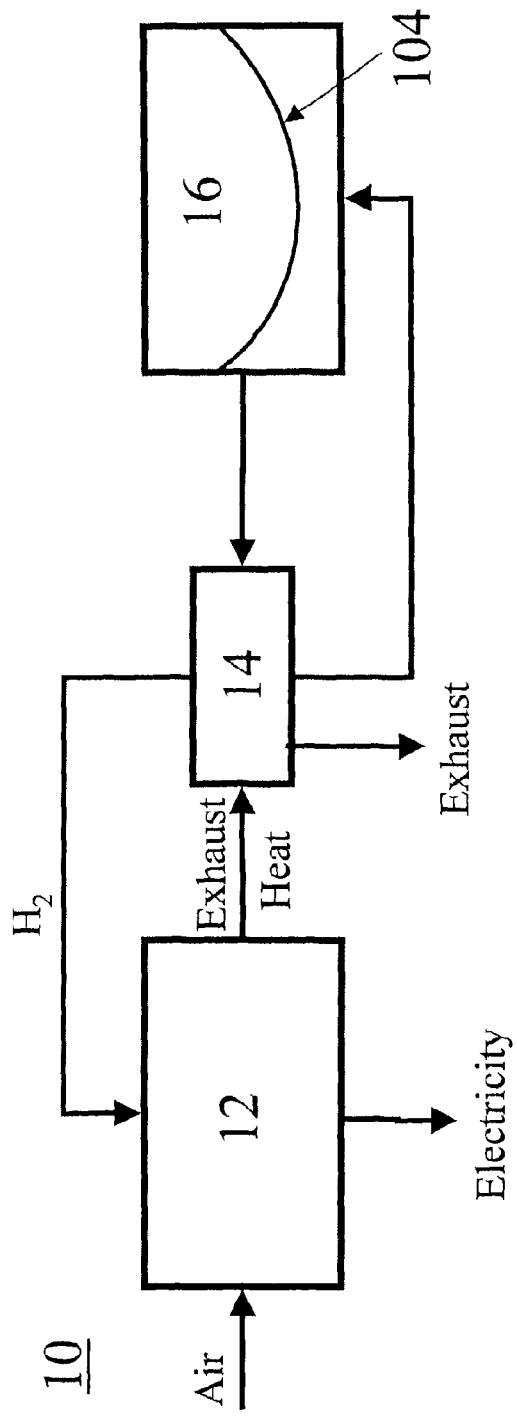
FIGS. 1-2 depict hydrogen storage/fuel cell systems.

As mentioned above metal hydrides are sensitive to moisture and oxygen. These sensitivities are a major obstacle to refueling strategies that involve pumping or delivering metal hydrides to a fixed onboard tank. Such a delivery method would surely result in exposure of the metal hydride to moisture, oxygen or both. The transfer of even less reactive solids in the powder form is also a very challenging task. This problem has been overcome through the use of an organic carrier as a matrix for metal hydrides, resulting in a movable hydrogen storage material comprising a metal hydride and organic carrier. The hydrogen storage material has several key advantages including high hydrogen storage capacity, as well as easy loading and removal of the material. The organic hydrogen carrier can function as a heating medium for hydrogen absorption, hydrogen desorption, or both absorption and desorption, and the organic hydrogen carrier can function as an additional source of hydrogen to the system, thus boosting the overall capacity of the storage material. In addition, the hydrogen storage material is capable of delivering hydrogen on demand in required quantities.

Organic hydrogen carriers include both liquids and gels. The organic hydrogen carrier is chosen such that it does not interfere with the metal hydride hydrogen absorption/desorption processes, and dehydrogenates in the temperature region close to the temperature region of dehydrogenation of the metal hydride. In some embodiments the organic hydrogen carrier dehydrogenates at a temperature within about 100° C. of dehydrogenation temperature of the metal hydride, or, more specifically within about 75° C. of the dehydrogenation temperature of the metal hydride, or, more specifically, within about 50° C. of the dehydrogenation temperature of the metal hydride. In some embodiments the organic hydrogen carrier has a boiling point greater than or equal to about 200° C. or, more specifically, greater than or equal to about 250° C., or, even more specifically, greater than or equal to about 300° C. The organic hydrogen carrier can have a boiling point less than or equal to about 400° C.

In some embodiments, the organic hydrogen carrier is a liquid hydrogen carrier. In some embodiments, the liquid organic hydrogen carrier comprises a cyclic hydrocarbon. In some embodiments, the liquid organic hydrogen carrier comprises a partially or fully hydrogenated nitrogen-containing aromatic heterocycle, for example, 2-aminopyridine, 4-methylpyrimidine, dipyrimidinemethane, dimethyltetrazine, dipyrimidine, diazacarbazole, alkylcarbazole, 4-aminopyridine, dipyrazinemethane, tripyrazinemethane, tripyrazineamine, dipyrazine, tetrazacarbazole, isoquinoline, di(2-pyridyl)amine, quinazoline, or combinations of two or more of the foregoing. In some embodiments, the liquid organic hydrogen carrier comprises a partially or fully hydrogenated aromatic hydrocarbon, for example naphthalene, benzene, anthracene, or combinations of two or more of the foregoing.

In some embodiments, the liquid hydrogen carrier is one of perhydro-N-ethylcarbazole, cyclohexane, tetrahydroisoquinoline, tetraline, decaline, and combinations thereof.

The organic hydrogen carrier is present in an amount sufficient to form a solution comprising the metal hydride, to coat the surfaces of the metal hydride and form a movable slurry when the metal hydride is in solid form, or form an emulsion when the metal hydride is in liquid or molten form. In some embodiments, the metal hydride is partially or fully soluble in the liquid organic carrier. Examples of solid metal hydrides include aluminum hydride $AlH_3$, metal alanates $M(AlH_4)_n$ (M=Li, Na, Mg), metal borohydrides $M(BH_4)_n$ (M=Li, Be, Mg, Zn), metal amidotrihydroborates $M(NH_2BH_3)_n$ (M=Li, Na, Mg, Ca). Examples of liquid and molten metal hydrides include aluminum borohydride $Al(BH_4)_3$ (which has a melting point of −64° C.), zirconium borohydride $Zr(BH_4)_4$ (which has a melting point of 29° C.), ammonia borane $H_3NBH_3$ (which has a melting point of 104° C.), and ammonia complex of magnesium borohydride $Mg(BH_4)_2 2NH_3$ (which has a melting point of 94° C.). The hydrogen storage material may comprise the organic carrier in an amount of about 30 to about 70 weight percent based on the total weight of the storage material. Within this range the amount of carrier can be greater than or equal to about 35 weight percent, or, more specifically, greater than or equal to about 50 weight percent. Also within this range the amount of carrier can be less than or equal to about 65 weight percent, or, more specifically, less than or equal to about 55 weight percent.

The metal hydride includes all metal hydrides capable of hydrogen absorption and desorption at temperatures of about 100° C. to about 300° C. Exemplary metal hydrides include both reversible and non-reversible metal hydrides. Reversible metal hydrides, such as $MgH_2$ and $NaAlH_4$ can cycle through the absorption/desorption cycle. Non-reversible metal hydrides can desorb hydrogen but desorption typically causes the metal hydride to break down to its component parts. Non-reversible metal hydrides can be regenerated in a separate system (off-board). Examples of non-reversible metal hydrides include aluminum hydride ($AlH_3$), boranes ($B_nH_m$) and complex metal hydrides. Complex metal hydrides include some alanates like $Mg(AlH_4)_2$, and metal borohydrides. Combinations of metal hydrides are also contemplated. Alanates are of the general formula (I)

$$M^1_{p(1-x)}M^2_{px}AlH_{3+p} \quad (I)$$

wherein $M^1$ can be sodium or potassium, $M^2$ can be lithium or potassium, $0 \leq x \leq$ about 0.8 and $1 \leq p \leq 3$.

Specific alanates include sodium alanate, potassium alanate, mixed sodium-lithium alanate, mixed sodium-potassium alanate, and mixed potassium-lithium alanate. In one embodiment the complex metal hydride comprises sodium alanate.

Metal borohydrides include boranes, polyhedral boranes, and anions of borohydrides or polyhedral boranes. Suitable borohydrides include, without limitation, neutral borane compounds such as decaborane(14) ($B_{10}H_{14}$); ammonia borane compounds of formula $NH_xBH_y$ and $NH_xRBH_y$, wherein x and y independently equal 1 to 4 and do not have to be the same, and R is a methyl or ethyl group; ammonia borane (borazane or $NH_3BH_3$); metal amidotrihydroborates $M(NH_2BH_3)_n$, borohydride salts $(M(BH_4)_n)$, triborohydride salts $(M(B_3H_8)_n)$, decahydrododecaborate salts $(M_2(B_{10}H_{10})_n)$, tridecahydrodecaborate salts $(M(B_{10}H_{13})_n)$, dodecahydrododecaborate salts $(M_2(B_{12}H_{12})_n)$, and octadecahydroicosaborate salts $(M_2(B_{20}H_{18})_n)$, where M is a cation selected from the group consisting of alkali metal cations, alkaline earth metal cations, aluminum cation, zinc cation, and ammonium cation, and n is equal to the charge of the cation. In some embodiments M is lithium, sodium, potassium, or calcium. In some embodiments metal borohydrides have the formula $M(BH_4)$, where M=Mg, Ca, Zn, Ti, Zr, and their complexes with ammonia $M(BH_4)_n mNH_3$ where m is equal or less than n. In some embodiments the metal borohydride is $Mg(BH_4)_2$. In some embodiments the metal borohydride is $Mg(BH_4)_2 2NH_3$. The boron hydride fuels may contain a stabilizer component, such as a metal hydroxide having the general formula $M(OH)_n$, wherein M is a cation selected from the group consisting of alkali metal cations such as sodium, potassium or lithium, alkaline earth metal cations such as calcium, aluminum cation, and ammonium cation, and n is equal to the charge of the cation.

The metal hydride may be present in an amount of about 30 to about 70 weight percent, based on the total weight of the hydrogen storage material. Within this range the metal hydride may be present in an amount greater than or equal to about 40 weight percent, or more specifically greater than or equal to about 45 weight percent. Also within this range the complex metal hydride may be present in an amount less than or equal to about 60 weight percent.

The hydrogen storage material may further comprise an absorption/desorption catalyst for the metal hydride or the liquid organic carrier or both. In some embodiments the catalyst is a dehydrogenation catalyst comprising Pd, Pt, Ru, Ni, and mixtures thereof, which can be on a high surface area support like activated carbon, alumina, silica and the like. In some embodiments the catalyst is a titanium compound or alloy. In some embodiments the catalyst is a borohydride catalyst. The borohydride catalyst can comprises a group IV, a group V, metal or a combination thereof, and an optional organic ligand, e.g. a cyclopentadienyl ligand. In some embodiments the metal is selected from the group consisting of titanium, zirconium or combinations thereof. Exemplary organic ligands include cyclopentadienyl, as mentioned above, as well as neutral ligands such as phosphines, amines, and ethers.

In some embodiments, the hydrogen storage material may further comprise a surfactant, which does not react with the metal hydride, to stabilize the slurry or the emulsion of the metal hydride in the organic hydrogen carrier. In some embodiments, the surfactant comprises dialkyl ether of polyethyleneglycol. In some embodiments, the surfactant comprises a salt of tetralkylammonium or tetrakylphosphonium cation with halide or borohydride anion.

The hydrogen storage materials may be prepared by simple mixing of pre-grinded metal hydride with the organic hydrogen carrier, or by ballmilling or dispersing the metal hydride in the organic hydrogen carrier. In some embodiments, the hydrogen storage material can be prepared by treatment of the slurry or emulsion of a metal borohydride with ammonia.

A hydrogen storage/fuel cell system 10 comprising a fuel cell 12 (e.g., a PEM fuel cell), a hydrogen storage material tank 16, and dehydrogenation reactor 14 is shown in FIG. 1. The fuel cell is in fluid communication with the dehydrogenation reactor. The dehydrogenation reactor is also in fluid communication with the hydrogen storage material tank. Hydrogen storage material can be moved from the hydrogen storage material tank to the dehydrogenation reactor by a number of methods including, but not limited to, a pressure differential, gravity feed, and pumping. As shown, hydrogen ($H_2$) generated on demand in the dehydrogenation reactor 14 and air electrochemically react within fuel cell 12 to produce electricity and an exhaust. The exhaust is typically used to heat the dehydrogenation reactor 14 to release the hydrogen for electrochemical reaction in the PEM fuel cell 12. The dehydrogenation reactor may have a catalytically active surface with a dehydrogenation catalyst to promote dehydrogenation of the organic hydrogen carrier. The dehydrogenation catalyst can also be dispersed in the movable mixture of the metal hydride and the liquid organic hydrogen carrier. System 10 further comprises storage tanks for storing the mixture of the hydrogen depleted liquid carrier and depleted metal hydride. System 10 may combine the two storage tanks required in the hydrogen storage system and utilize a single storage tank or vessel 16 comprising a separator 104, for example a membrane separator, that divides the storage tank or vessel into multiple portions to store both the slurry of metal hydride in the organic hydrogen carrier and the hydrogen depleted liquid and metal hydride. In another embodiment, the membrane separator 104 is a flexible membrane.

Such an arrangement makes the system 10 much more compact and efficient, especially in the re-fueling process.

Figure 2:
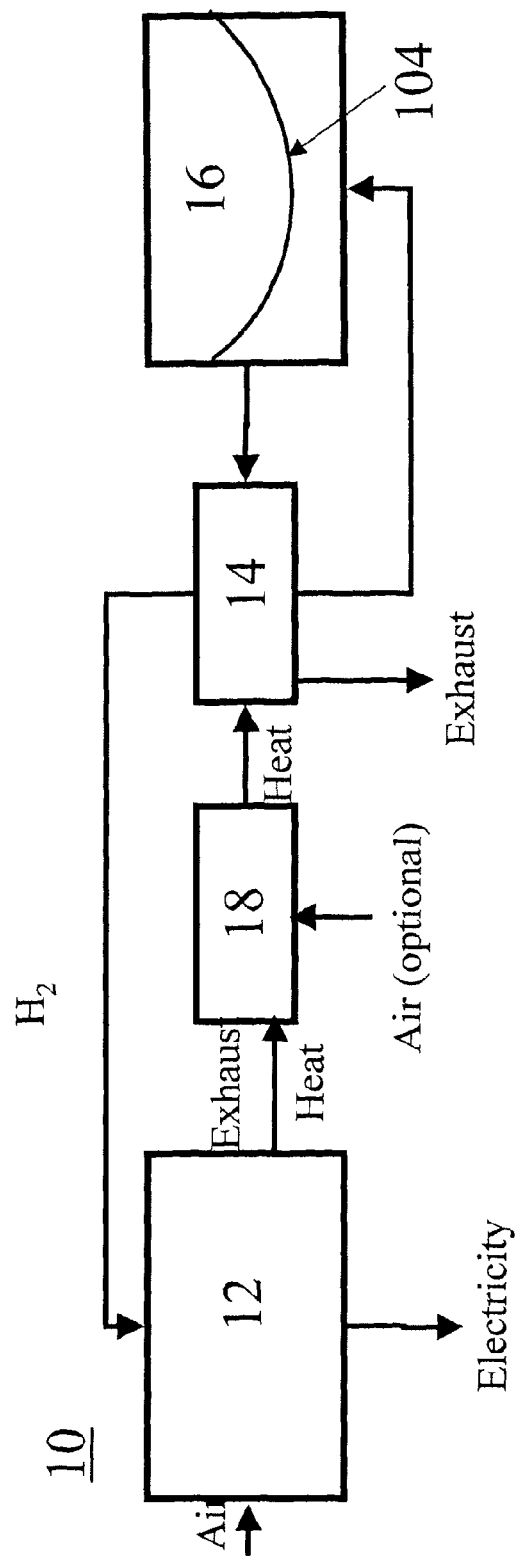

In some embodiments a fuel cell system 10 further comprises a catalytic combustor 18 as shown in FIG. 2. Fuel cell system 10 comprises a fuel cell 12, a catalytic combustor 18, a dehydrogenation reactor 14 and a hydrogen storage tank 16. The anode exhaust from the fuel cell 12 containing unconsumed hydrogen is combusted in catalytic combustor 18 using a cathode exhaust and optional air to produce an offgas with a temperature greater than about 150° C., and typically greater than about 300° C. The higher temperature offgas is used to release the hydrogen from the dehydrogenation reactor 14. In some embodiments the catalytic combustor is coupled with an electric heater for starting the fuel cell at lower temperatures. Catalytic combustors and fuel cell systems comprising them are further described in U.S. Published Patent Application Nos. 2007/0026272 and 2007/0128485. The storage tank 16 is combined from the two storage tanks for storing hydrogen rich and hydrogen depleted storage material separated by a separator 104.

The foregoing materials are further described in the following non-limiting examples.

EXAMPLES

Metal hydrides were synthesized in-house and subsequently characterized by elemental analysis and x-ray diffraction crystallography (XRD). Perhydro-N-ethylcarbazole (CAS#146900-30-3) was obtained from Air Products.

Hydrogen desorption experiments were carried out in a 50 ml three neck flask equipped with a condenser, and stopcocks for gas inlet and gas outlet. The flask was charged with 0.5-1 milliliter (ml) perhydro-N-ethylcarbazole, a dehydrogenation catalyst (5% $Pd/Al_2O_3$), a metal hydride and a magnetic stir bar in an argon glove box. The flask was set atop a heating mantle and attached to nitrogen purge. After a 15 minute nitrogen purge the gas outlet was connected to a 3 liter (L) mercury-sealed piston volume prover equipped with a pressure gauge to measure the evolving gas. Heating was controlled by a Digi-Sense temperature controller. The temperature increased from 30-250° C. at 2° C./min, then from 250-275° C. at 1° C./min. The final gas measurement was done after cooling the setup to room temperature. Gas volume was corrected for temperature and pressure. Liquid products were analyzed by GCMS and NMR. The results are presented in the table below. The amount of metal hydride carrier, and catalyst are shown in grams (g). "MH, wt %" is the weight percent of metal hydride in the mixture. "Carrier conversion" refers to the conversion of the organic hydrogen carrier to the fully dehydrogenated product. "Total $H_2$, wt %" is weight percent of hydrogen released from the mixture of the metal hydride and the organic hydrogen carrier.

| Formula | Metal hydride | | Liquid carrier, g | Catalyst, g | MH, wt. % | $H_2$ formed mL | Carrier conversion, %** | Total $H_2$, wt. % |
| --- | --- | --- | --- | --- | --- | --- | --- | --- |
| | % H at 275° C.* | g | | | | | | |
| None (control) | — | — | 1.21 | 0.042 | — | 690 | 90.5 | 4.99 |
| $AlH_3$ | 9.9 | 0.50 | 0.99 | 0.052 | 32.4 | 1125 | 92.0 | 6.58 |
| $BH_3NH_3$ | 12.0 | 0.77 | 1.20 | 0.040 | 38.3 | 1325 | 39.8 | 5.95 |
| $Mg(BH_4)_2 2NH_3$ | 9.6 | 0.74 | 1.13 | 0.047 | 38.7 | 1130 | 47.9 | 5.32 |

*$H_2$ released from pure metal hydride at 275° C.
**assuming 100% conversion of the metal hydride NMR and GCMS of the liquid phase after dehydrogenation shows practically full conversion of starting perhydro-N-ethylcarbazole to aromatic N-ethylcarbazole in the control experiment and experiment with aluminum hydride. Addition of aluminum hydride allows increasing of hydrogen capacity of the storage material to more than 30%. When $BH_3NH_3$ and $Mg(BH_4)_2 2NH_3$ were used as metal hydrides, only partial conversion was observed, due to poisoning of the Pd catalyst with traces of ammonia released from these hydrides. The use of a dehydrogenation catalyst not sensitive to ammonia will increase the conversion and total hydrogen storage capacity of the material.

In the specification and the claims, reference is be made to a number of terms, which shall be defined to have the following meanings. The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The invention claimed is:

1. A hydrogen storage material, comprising a metal hydride and an organic hydrogen carrier, wherein the organic hydrogen carrier comprises a partially or fully hydrogenated, nitrogen-containing aromatic heterocycle.

2. The storage material of claim 1, wherein the organic hydrogen carrier is in liquid form.

3. The storage material of claim 1, wherein the organic hydrogen carrier dehydrogenates at a temperature within about 100° C. of the dehydrogenation temperature of the metal hydride.

4. The storage material of claim 1, wherein the organic hydrogen carrier has a boiling point greater than or equal to about 200° C.

5. The storage material of claim 1, wherein the metal hydride is present in an amount of 30 to 70 weight percent based on the total weight of the hydrogen storage material.

6. The storage material of claim 1, further comprising a surfactant.

7. The storage material of claim 1, wherein the organic hydrogen carrier comprises 2-aminopyridine, 4-methylpyrimidine, dipyrimidinemethane, dimethyltetrazine, dipirimidine, diazacarbazole, alkylcarbazole, 4-aminopyridine, dipyrazinemethane, tripyrazinemethane, tripyrazineamine, dipyrazine, tetrazacarbazole, isoquinoline, di(2-pyridyl)amine, quinazoline, or a combination of two or more of the foregoing.

8. The storage material of claim 1, wherein the organic hydrogen carrier comprises perhydro-N-ethylcarbazole, tetrahydroisoquinoline, or a combination thereof.

9. The storage material of claim 1, wherein the hydrogen storage material is a slurry.

10. The storage material of claim 1, wherein the hydrogen storage material is an emulsion.

11. The storage material of claim 1, wherein the organic hydrogen carrier is present in an amount of about 30 to about 70 weight percent based on the total weight of the hydrogen storage material.

12. The storage material of claim 1, wherein the metal hydride has hydrogen absorption and hydrogen desorption temperatures of about 100° C. to about 300° C.

13. The storage material of claim 1, wherein the metal hydride comprises a reversible metal hydride.

14. A hydrogen storage material, comprising a non-reversible metal hydride and an organic hydrogen carrier.

15. The storage material of claim 14, wherein the metal hydride comprises aluminum hydride.

16. The storage material of claim 14, wherein the metal hydride comprises an ammonia complex of metal borohydride.

17. The storage material of claim 16, wherein the ammonia complex of metal borohydride is diammoniate of magnesium borohydride $Mg(BH_4)_2 2NH_3$.

18. The storage material of claim 14, wherein the metal hydride comprises ammonia borane.

19. The storage material of claim 14, wherein the metal hydride comprises a metal amidotrihydroborate $M(NH_2BH_3)_n$.

20. The storage material of claim 19, wherein the metal amidotrihydroborate is lithium amidotriborohydride $LiNH_2BH_3$.

21. A hydrogen storage material, comprising a metal hydride, an organic hydrogen carrier, and a dehydrogenation catalyst for the metal hydride.

22. The storage material of claim 21, wherein the dehydrogenation catalyst is a metal borohydride catalyst.

23. A hydrogen storage material, comprising a non-reversible metal hydride, a dehydrogenation catalyst, and a liquid organic hydrogen carrier.

24. A hydrogen storage material, comprising a reversible metal hydride, a dehydrogenation catalyst, and a liquid organic hydrogen carrier.

25. A hydrogen storage/fuel cell system, comprising:
   a fuel cell in fluid communication with a dehydrogenation reactor; and
   a hydrogen storage material tank in fluid communication with the dehydrogenation reactor; wherein the hydrogen storage material tank contains a hydrogen storage material, and the hydrogen storage material comprises a metal hydride and an organic hydrogen carrier.

26. The hydrogen storage/fuel cell system of claim 25, wherein the dehydrogenation reactor has a catalytically active surface.

27. The hydrogen storage/fuel cell system of claim 25, further comprising a storage tank for depleted hydrogen storage material.

28. The hydrogen storage/fuel cell system of claim 25, wherein the hydrogen storage material tank comprises a first portion for storage of hydrogen storage material, and a second portion for storage of depleted hydrogen storage material.

29. The hydrogen storage/fuel cell system of claim 28, wherein the first portion and second portion are separated by a flexible membrane.

30. The hydrogen storage/fuel cell system of claim 25, further comprising a catalytic combustor in fluid communication with the fuel cell and the dehydrogenation reactor.

* * * * *